H. SNELL.
FRUIT SORTING APPARATUS.
APPLICATION FILED MAR. 23, 1918.

1,281,090.

Patented Oct. 8, 1918.
4 SHEETS—SHEET 3.

Witnesses

Inventor
Harry Snell,
By
Attorneys

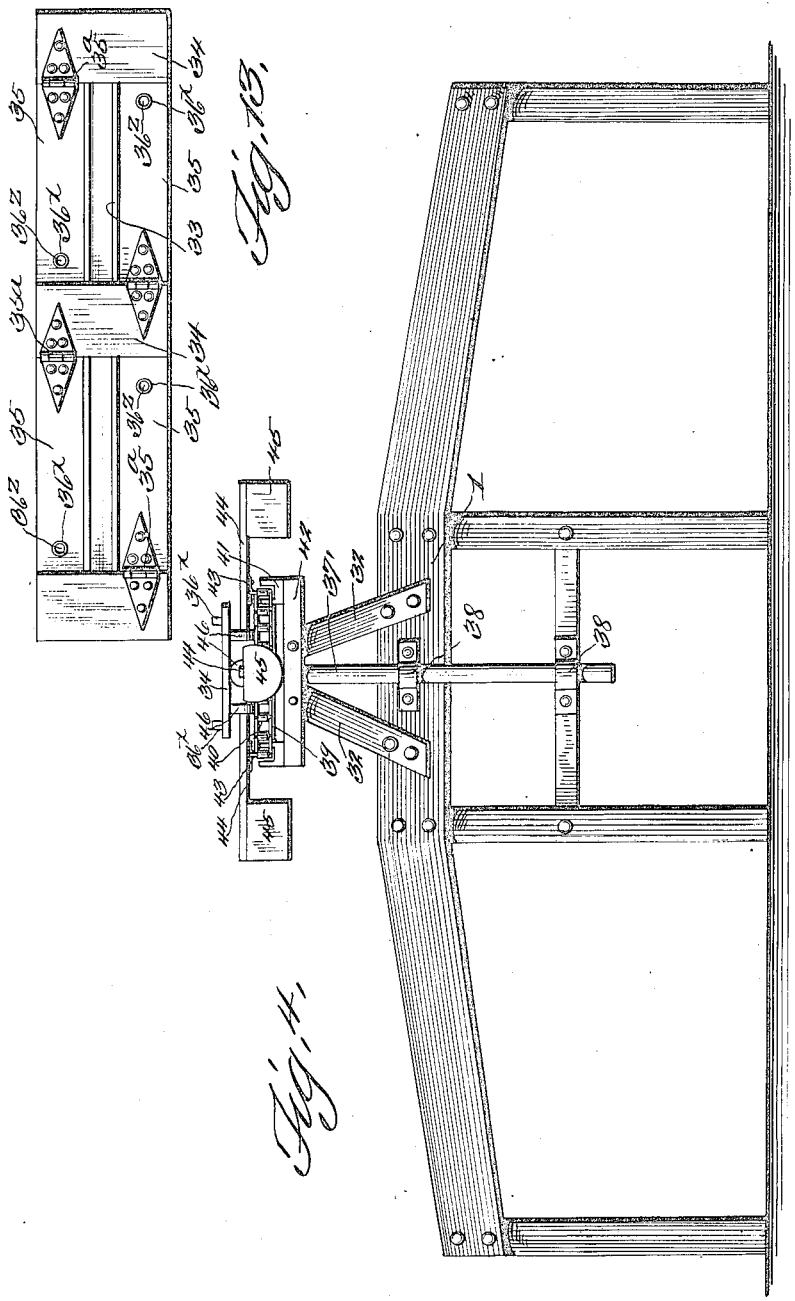

UNITED STATES PATENT OFFICE.

HARRY SNELL, OF SEATTLE, WASHINGTON.

FRUIT-SORTING APPARATUS.

1,281,090.   Specification of Letters Patent.   Patented Oct. 8, 1918.

Application filed March 23, 1918. Serial No. 224,248.

*To all whom it may concern:*

Be it known that I, HARRY SNELL, a citizen of the United States, residing at Seattle, in the county of King and State of Washington, have invented certain new and useful Improvements in Fruit-Sorting Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for separating fruit of even size and weight into distinct bins, and comprises a simple and efficient device of this nature having various details of construction, combinations and arrangements of parts which will be hereinafter fully described, shown in the accompanying drawings and then specifically defined in the appended claims.

My invention is illustrated in the accompanying drawings which, with the letters of reference marked thereon, form a part of this specification and in which:

Fig. 4 is a view in elevation of the opposite end.

Fig. 5 is a vertical sectional view on line 5—5 of Fig. 2.

Fig. 6 is an enlarged detail in elevation showing the manner of automatically depositing the fruit into a bin.

Fig. 7 is an enlarged view in elevation of a portion of an endless fruit carrier.

Figure 1:
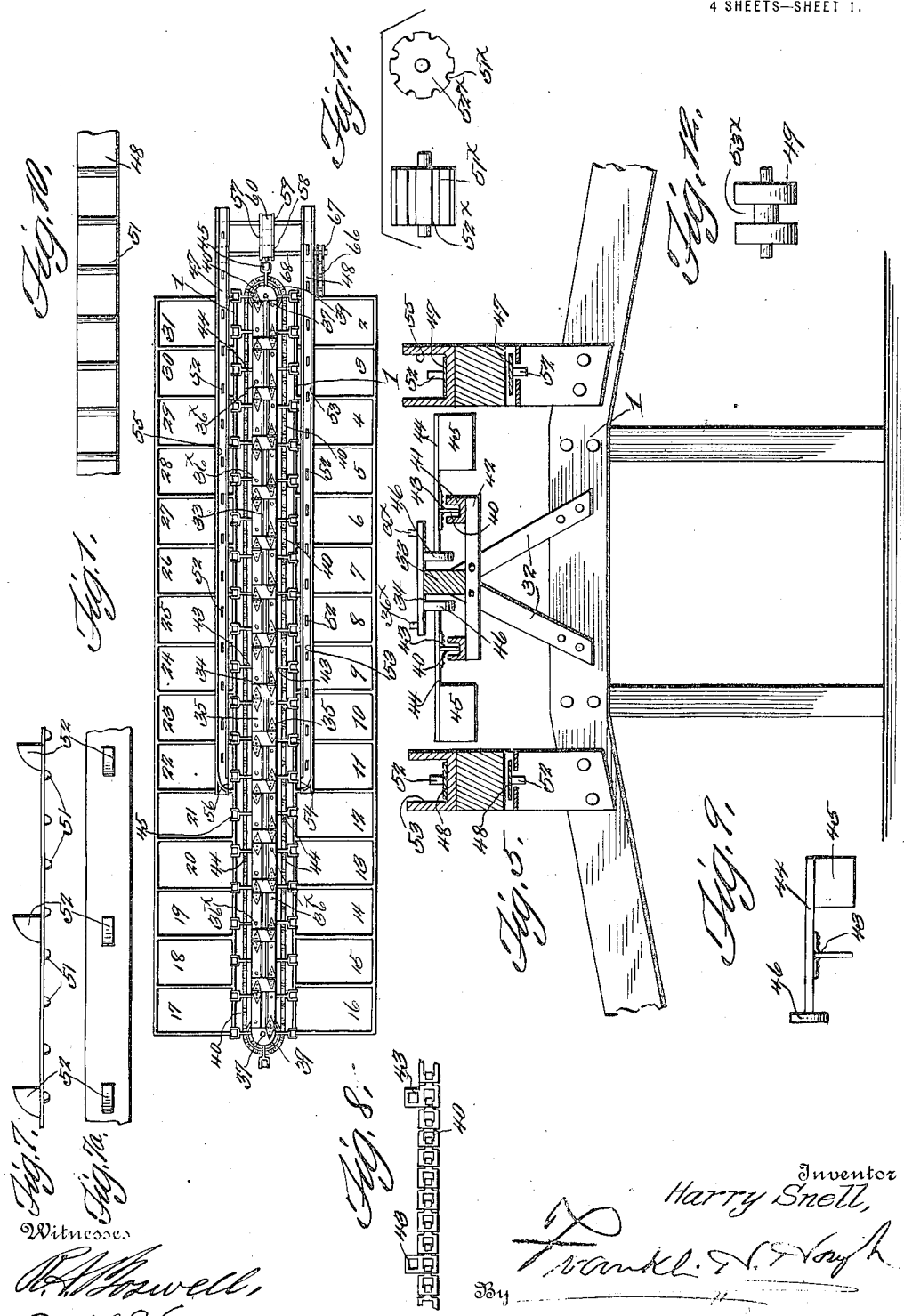
Figure 1 is a top plan view of my fruit sorting apparatus.

Fig. 7ª is a plan of the part illustrated in Fig. 7.

Fig. 8 is a detail view of a section of the endless chain carrier.

Fig. 9 is a detail of a tilting fruit carrying member.

Fig. 10 is a view of the under side of the endless carrier.

Figs. 11, and 12 are detailed views of parts of the machine, Fig. 13 is a top plan view of several of the hinged plates, Fig. 14 is an enlarged top plan view of one of the apertures and Fig. 15 is a detailed view of one of the weighted members upon the tilting members.

Reference now being had to the details of the drawings by numerals:

1 designates the frame having two series of bins upon either side thereof, those upon one side being designated by numerals 2 to 16 inclusive, and those upon the opposite side by numerals 17 to 31 inclusive, although the number may vary according to the size of the machine, the various bins being adapted to receive fruit of different grades and sizes. Mounted centrally upon the frame and supported by the bracket members 32, as shown in Fig. 5 of the drawings, is a beam 33 extending substantially the length of the machine and supported upon said beam is a series of plates 34 to which are hinged upon opposite edges thereof and in diagonal relation to each other, the weighted plates 35, which are in alinement with one another, those hinged upon the same side of the beam 33 opening in the same direction, those upon the opposite side of the central beam open in the opposite direction. Each of said weighted plates is provided with an adjustable weight 36, in order that it may be adjusted to cause fruit of a certain weight to be deposited into one or another of the bins provided therefor. Said weights, a detail of one of which is shown in Fig. 15, consists of a cylindrical member $36^x$ mounted near the free swinging end of the tilting member, made preferably of metal, and pressed in the shape of a cylinder open at one end and having corrugations spirally formed therein and in which may be screwed lead weights from the three to twenty ounces, which weights are molded to fit the corrugations. The weighted members are fastened to the tilting members in any suitable manner, as by screws passing through the bottoms thereof and into the various plates.

Mounted horizontally upon the vertically disposed shafts 37 and 37', which are journaled in bearings 38 upon the frame, one of which is shown in Fig. 4 of the drawings, are the sprocket wheels 39, and 40 designates an endless chain mounted upon said sprocket wheels 39.

Troughs 41 parallel to each other are mounted upon the cross piece 42 supported by the braces 32, shown clearly in Fig. 5 of the drawings and which troughs receive the endless chain and tend to support the same intermediate the sprocket wheels, said chain moving frictionally through the troughs.

Figure 2:
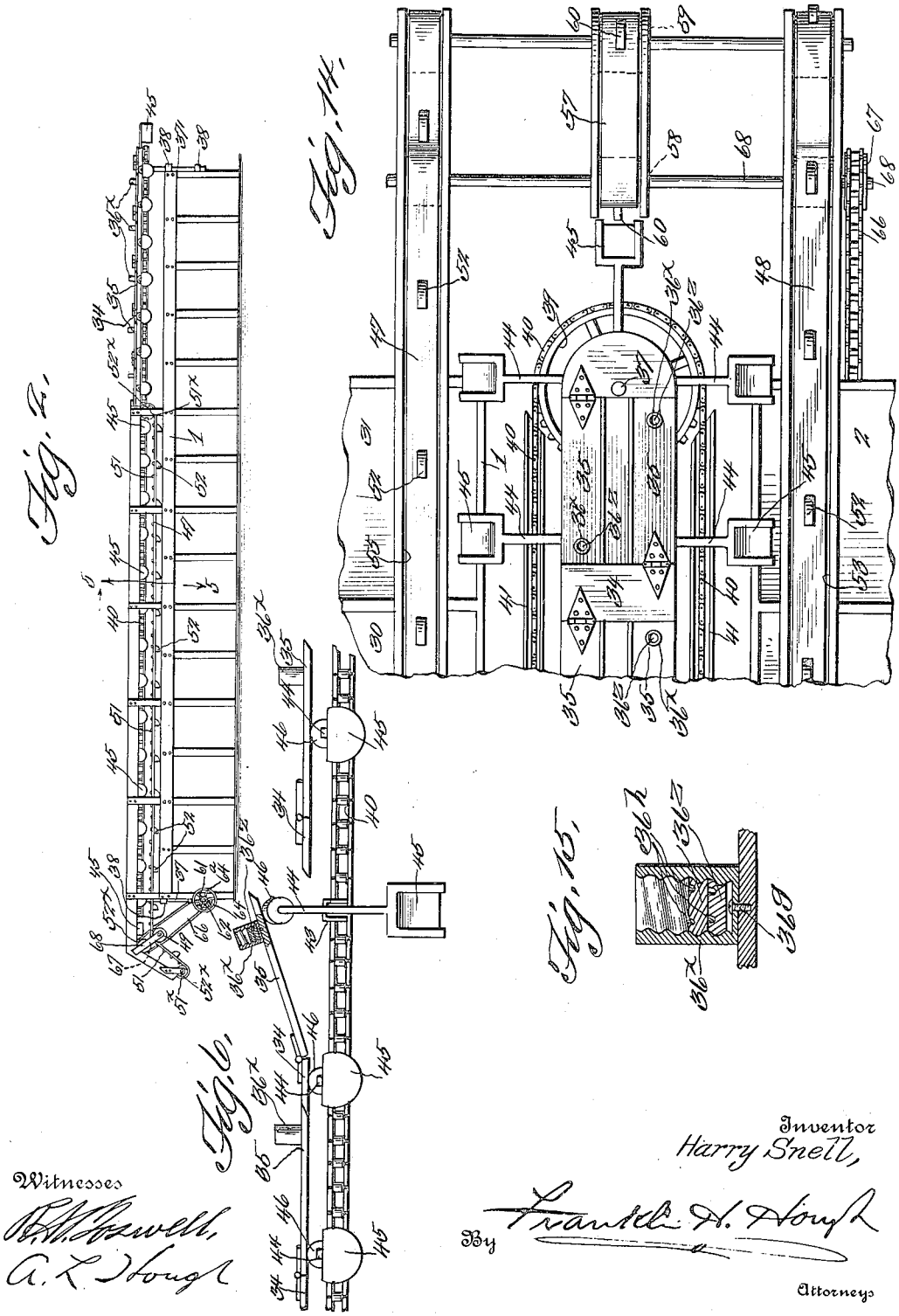
Fig. 2 is a side elevation.

Said endless chain is provided at intervals with links 43, details of which are shown in Fig. 8 of the drawings, and which project at slight distances above the other links of the chain, and pivotally mounted upon said extensions of the links are the tilting members 44, details of which are shown in Fig. 5 of the drawings, and also in detail in Fig. 9. Said members 44 have fruit receiving receptacles 45, having their outer ends open, made preferably of canvas or other suitable material which will not injure the fruit as it drops, and at its opposite end is journaled a pulley 46 which is adapted to roll against the under surfaces of the several weighted plates and also the plates 34, as the endless chain travels about the sprocket wheels. Mounted upon either side of the endless carrier chain are the endless fruit carrying belts 47 and 48, movable in grooved ways 55 and 53 respectively, and passing over the pulleys 49, a detail of one of which is shown in Fig. 12 of the drawings. Each pulley has a central groove 53× which will permit the fruit spacers 52 to move freely by the pulley without friction. Said endless carriers have ribs 51 spaced apart upon the inner faces of the belts and which engage grooves 51× in the rollers 52× suitably mounted in bearings as shown in Fig. 2 of the drawings. Projecting from the surfaces of said belts are the fruit spacers 52 positioned distances apart equal to the distances between the several fruit carrying receptacles 45. The grooved way in which the belt 48 travels has an exit end 54, while the grooved way in which the belt 47 travels has an exit 56. Intermediate the two endless belts 47 and 48 is an elevating endless belt 57 shown in Fig. 1 of the drawings, and which travels over suitable sprocket wheels 58 and 59, said endless elevating belt being provided with fruit spacing members 60.

Figure 3:
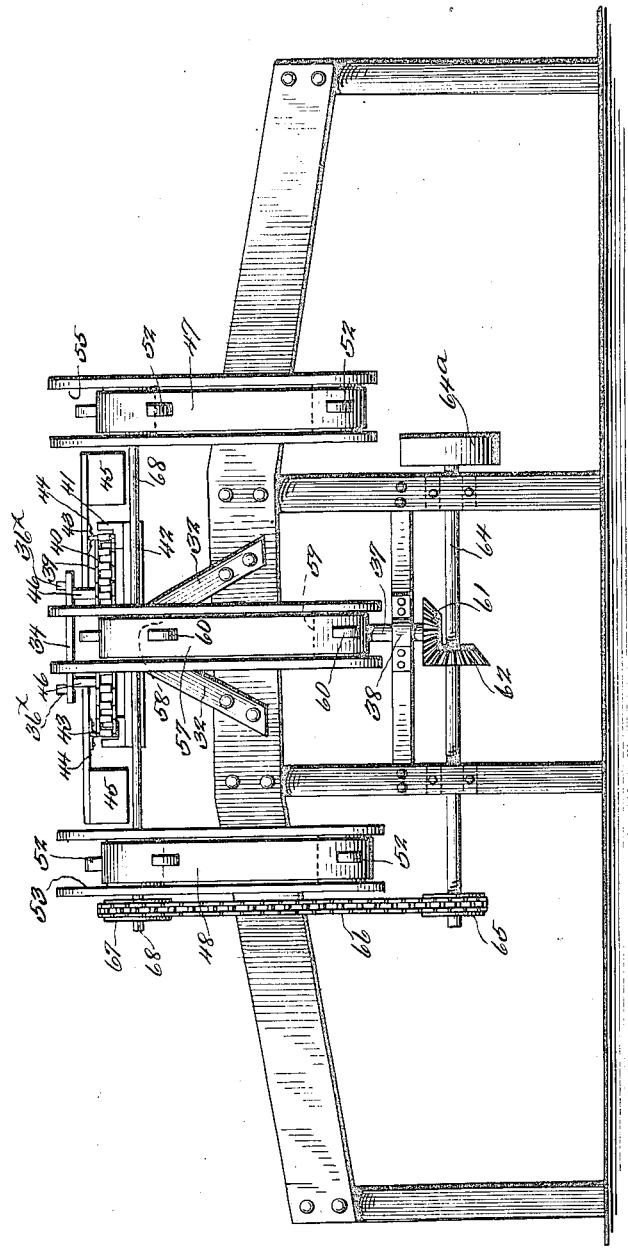
Fig. 3 is a view of one end.

Upon reference to Fig. 3 of the drawings it will be noted that a beveled pinion 61 is fastened to the lower end of the shaft 37 and is in mesh with a similar pinion 62 keyed to the shaft 64, and 65 is a sprocket wheel also keyed to the shaft 64 and about which a sprocket chain 66 passes and also over a sprocket wheel 67 is keyed to the shaft 68 upon which the sprocket wheel 52 is mounted, and which gear and sprocket mechanism affords means for imparting properly timed movements to the endless chain carrying the fruit receptacles and the endless belts. Power from any source (not shown) is utilized for driving the shaft 64, through the medium of the pulley 64a thereon.

In the drawings I have shown a machine capable of handling three different grades of fruit at one time and separating each grade into ten different sizes, and in operation the attendants place the first grade fruit in the central elevating carrier 57 at the end of the machine nearest the sorting table. At a predetermined moment when the fruit placed upon the endless belt 57 is in readiness to be deposited into the fruit receptacle 45, one of the latter will have reached the proper position, as shown in Fig. 1, to receive the same, the fruit rolling into the receptacle 45 and carried with the endless chain until the anti-friction roller 46 journaled upon the inner end of the member 44 carrying the receptacle, comes in contact with the under surface of the weighted plate, the weight of which is adjusted to be slightly under the weight of the fruit in the receptacle and which receptacle with the fruit therein slightly overbalances the weighted plate, causing the latter to swing up and the member 44 carrying the receptacle will tilt down, permitting the fruit to roll out into the bin adapted to receive fruit of a certain weight. After the fruit has been deposited, the fruit carrier receptacle and the weighted plate will return to their normal positions by the weight of the weighted plate.

It will be noted that the hinged doors are of graduated weights, being of certain weight where the anti-friction rollers 46 first come in contact with the doors and diminishing in weight as the distance increases from the point of receiving the fruit at the three different locations, thus causing the heavy fruit to drop first by the force of its own weight, overbalancing the weight on the weighted plate. The lighter fruit will pass on until it comes in contact with a weighted plate of lighter weight than the fruit itself and will be dropped into the bin provided for its size. At three different locations on the machine the weighted plates will be made so light as to cause all fruit carrying receptacles 45 to dump whether there is any fruit in them or not, thus preventing the carrying of a light fruit around to a point where it will receive another fruit, and the two light fruit will be dropped where one heavier fruit should have been dropped.

The result of the operation of the apparatus will be to make fruit of even size drop into distinct bins each for a particular weight of fruit. Said weighted plates being provided with adjustable weights may be regulated at the option of the operator, so as to allow the separation of fruit of very little differences in size.

The first grade fruit, which is delivered by the central conveyer 57 and deposited through the mechanism shown into any one of the various bins 2 to 11, provided therefor according to the weight of the fruit and according to the quality of fruit carried upon the endless belt 48 and will be delivered through the exit opening 44 into the successive fruit carrying receptacles 45 as they pass by the exit opening 44 and will be automatically deposited in one or another of the bins 12 to 21 inclusive.

Still another grade of fruit which is conveyed by the endless belt 47 will be delivered at the exit opening 56 into the successive fruit receiving receptacles 45 as they return toward the sorting table, and the fruit of the third grade will be automatically delivered at the exit opening 56 into the fruit receptacles 45 on their return movement toward the sorting table and will be deposited into one or another of the bins 22 to 31 according to the weight of the fruit.

From the foregoing it will be noted that by the provision of my improved fruit sorting apparatus, which is especially designed for sorting apples, but applicable for any kind of fruit, the different sized fruit will be automatically sorted into distinct bins, the carrier belts being slightly inclined in order to facilitate the depositing of fruit into the various tilting fruit receiving receptacles. The inclinations of the endless belt carriers, it will be noted, are gradual and strongest at the disposing ends thereof. It will be also noted that the tilting members 54 mounted upon the extension portions of the links and which members are spaced apart are sufficiently elevated in order to clear the sprocket wheels and troughs in which the chain travels.

What I claim to be new is:

1. A fruit sorter comprising a frame, an endless conveyer chain mounted thereon, individual fruit carrying members mounted upon and movable with the conveyer and spaced apart, hinged weighted means against which said fruit carrying members are adapted to contact and permitting the latter to tilt to discharge the fruit therefrom.

2. A fruit sorter comprising a frame, an endless conveyer chain mounted thereon, individual fruit carrying members mounted upon and movable with the conveyer and spaced apart, and means for tilting the fruit singly into said fruit carriers, hinged weighted means against which the upper surface of the inner ends of the fruit carrying members are adapted to contact, the weight of the fruit and the carrier causing the weighted member to tilt permitting the fruit to be discharged.

3. A fruit sorter comprising a frame, an endless conveyer chain mounted thereon, individual fruit carrying members mounted upon and movable with the conveyer and spaced apart, an anti-friction wheel pivotally mounted at the inner end of each individual fruit carrier, hinged weighted means against which said wheels are adapted to contact, the weight of the fruit and carrier tending to counterbalance the weighted means causing the same to swing to permit the fruit to be discharged.

4. A fruit sorter comprising a frame, an endless conveyer chain mounted thereon, individual fruit carrying members mounted upon and movable with the conveyer and spaced apart, means for guiding the conveyer chain at the inner end of each individual fruit carrying member, a series of hinged weighted members against which said wheels contact causing the hinged members to tilt when the weight of the fruit and carrier overbalances the weight of the hinged members.

5. A fruit sorter comprising a frame, horizontally rotatable sprocket wheels journaled therein, an endless chain carrier mounted upon said sprocket wheels, the links of the chain spaced apart having extensions, members pivotally mounted upon said extensions, a fruit carrying receptacle at the outer end of each member and an anti-friction wheel at the inner end, a series of weighted hinged members against which said anti-friction wheels are adapted to contact causing the hinged members to swing to permit the fruit carrying members to tilt and discharge the fruit therefrom.

6. A fruit sorter comprising a frame, horizontally rotatable sprocket wheels journaled therein, an endless chain carrier mounted upon said sprocket wheels, the links of the chain spaced apart having extensions, members pivotally mounted upon said extensions, a fruit carrying receptacle at the outer end of each member and an anti-friction wheel at the inner end, a series of weighted hinged members against which said anti-friction wheels are adapted to contact causing the hinged members to swing to permit the fruit carrying members to tilt and discharge the fruit therefrom, endless belt fruit carriers, and fruit spacers thereon adapted to deliver fruit singly to said fruit receptacles upon the endless chain carriers.

7. A fruit sorter comprising a frame, horizontally disposed rotatable sprocket wheels, an endless chain passing about the same, the links of the chain spaced apart, having extensions, a tilting member pivotally mounted upon each of said extensions, a fruit receptacle at the outer end of each member, and an anti-friction wheel pivoted at its inner end, a series of hinged plates against the under surface of which said anti-friction wheels are adapted to contact, weight adjusting means upon said plates permitting the same to swing under different weights of fruit in said receptacle to permit the fruit to be automatically discharged, endless fruit conveying belts and fruit spacers upon said belts adapted to deliver fruit singly into said receptacles.

8. A fruit sorter comprising a frame, horizontally disposed rotatable sprocket wheels, an endless chain passing about the same, the links of the chain spaced apart, having extensions, a tilting member pivotally mounted upon each of said extensions, a fruit receptacle at the outer end of each member, and an anti-friction wheel pivoted at its inner end, a series of hinged plates against the under surface of which said anti-friction wheels are adapted to contact, weight adjusting means disposed at inclinations and provided with fruit spacers projecting therefrom spaced apart designed to deliver fruit singly to said receptacles.

9. A fruit sorter comprising a frame, horizontally disposed rotatable sprocket wheels, an endless chain passing about the same, the links of the chain spaced apart, having extensions, a tilting member pivotally mounted upon each of said extensions, a fruit receptacle at the outer end of each member, and an anti-friction wheel pivoted at its inner end, a series of hinged plates against the under surface of which said anti-friction wheels are adapted to contact, weight adjusting means disposed at inclinations and provided with fruit spacers projecting therefrom spaced apart designed to deliver fruit singly to said receptacles, a series of bins into which different grades of fruit are adapted to be automatically discharged.

10. A fruit sorter comprising a frame, an endless chain, and sprocket wheels about which the same travels, individual tilting fruit carrying members mounted upon said chain at regular intervals, a series of weighted hinged plates which permit said fruit carriers to tilt, a series of bins, an endless conveyer belts upon either side of the endless conveyer chain, an endless conveyer belt terminating at the end of the machine intermediate the other belt carriers, troughs in which the endless belts travel, and each trough having an exit opening in the side thereof near its end, and fruit spacers projecting from the upper surface of the belt.

In testimony whereof I hereunto affix my signature in presence of two witnesses.

HARRY SNELL.

Witnesses:
F. W. LILLEY,
W. F. PICHON.